June 8, 1965
J. SIMPSON
3,187,876
CAN TURNING DEVICE
Filed March 19, 1963
6 Sheets-Sheet 1
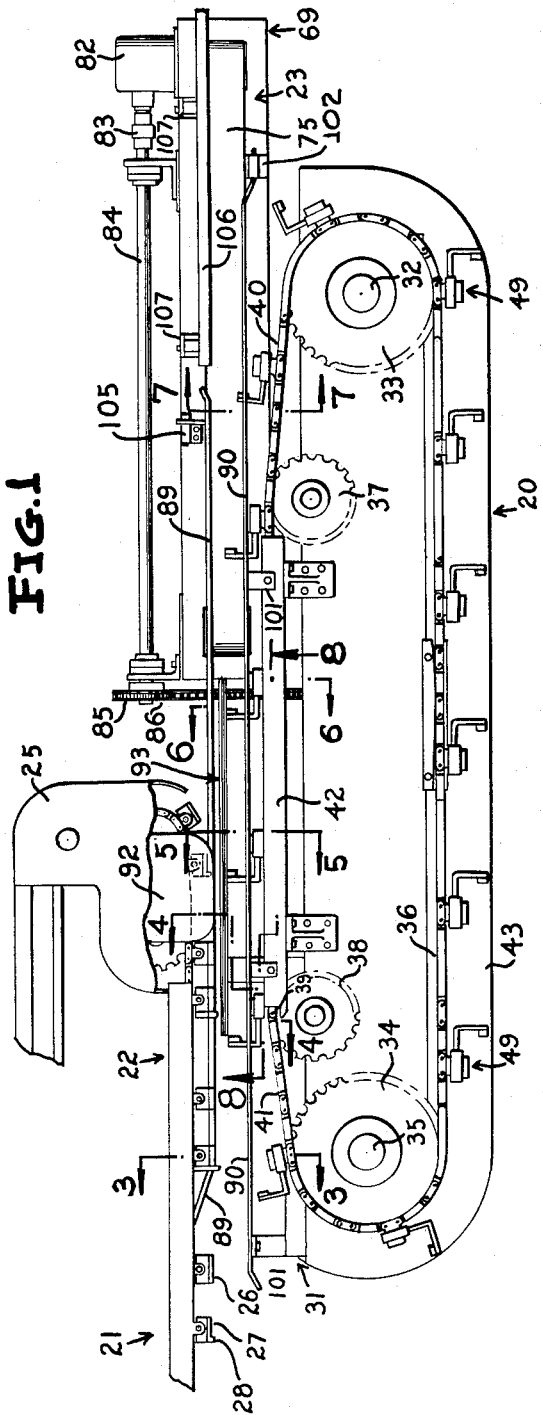
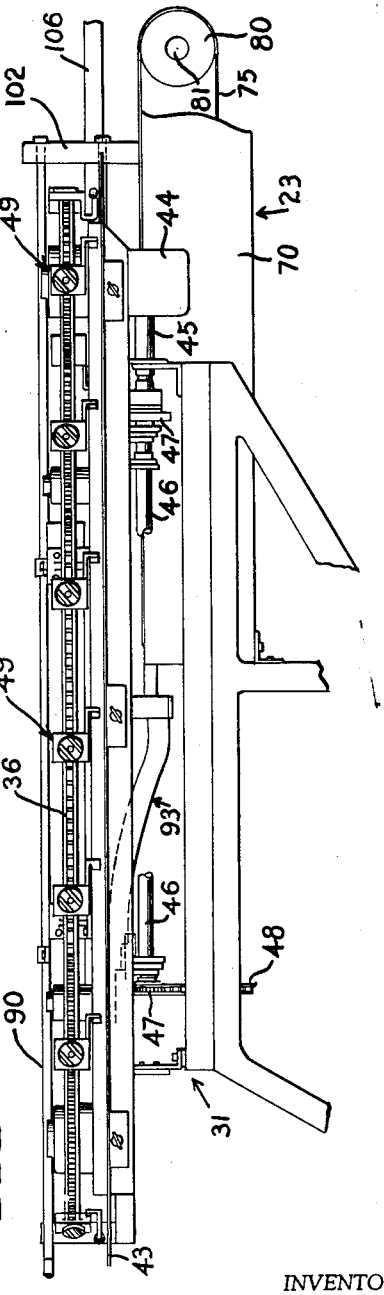
INVENTOR
*Justin Simpson*
BY
*Mason, Porter, Diller & Stewart*
ATTORNEYS

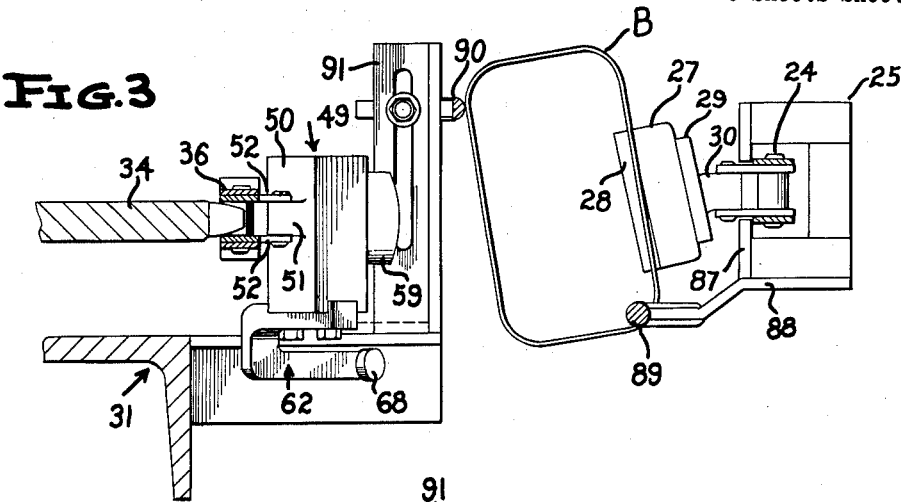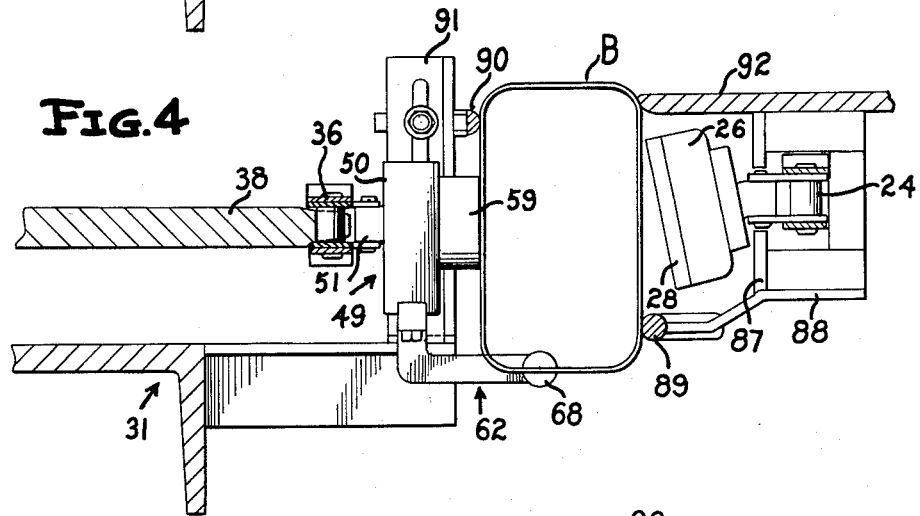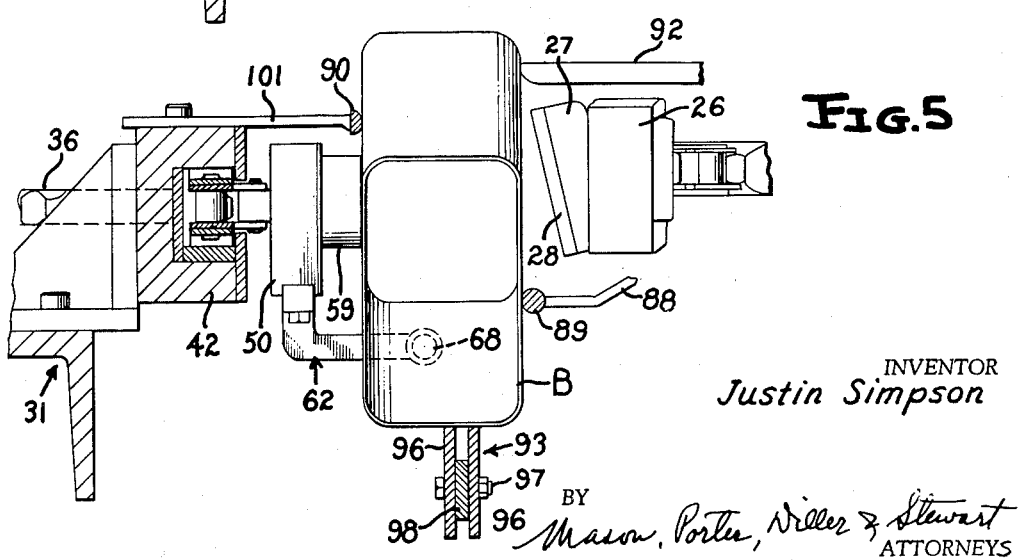

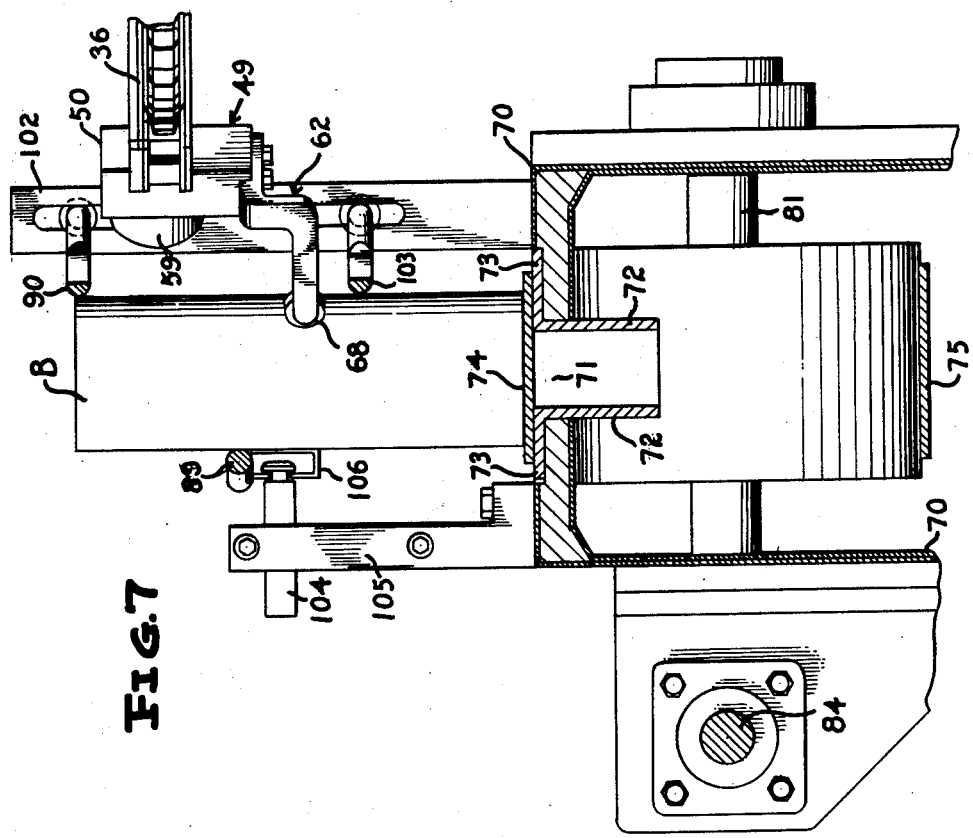
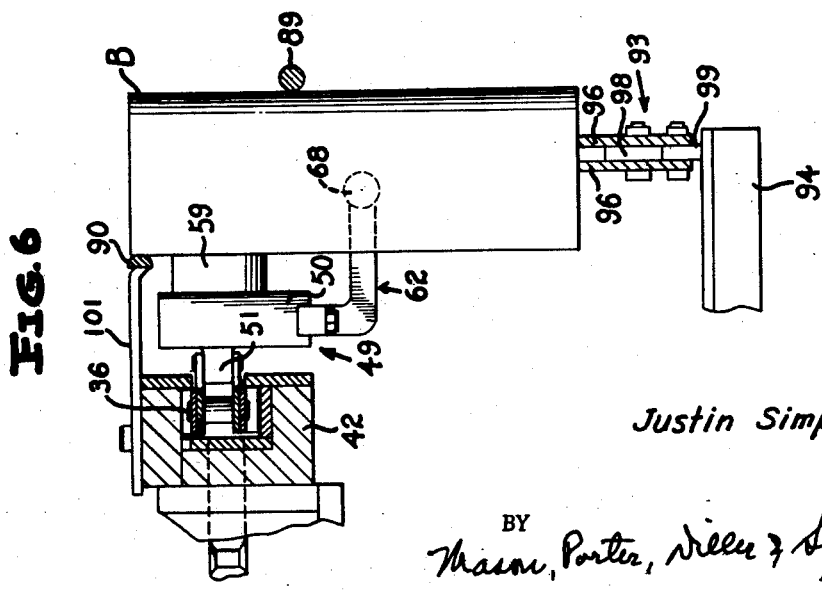

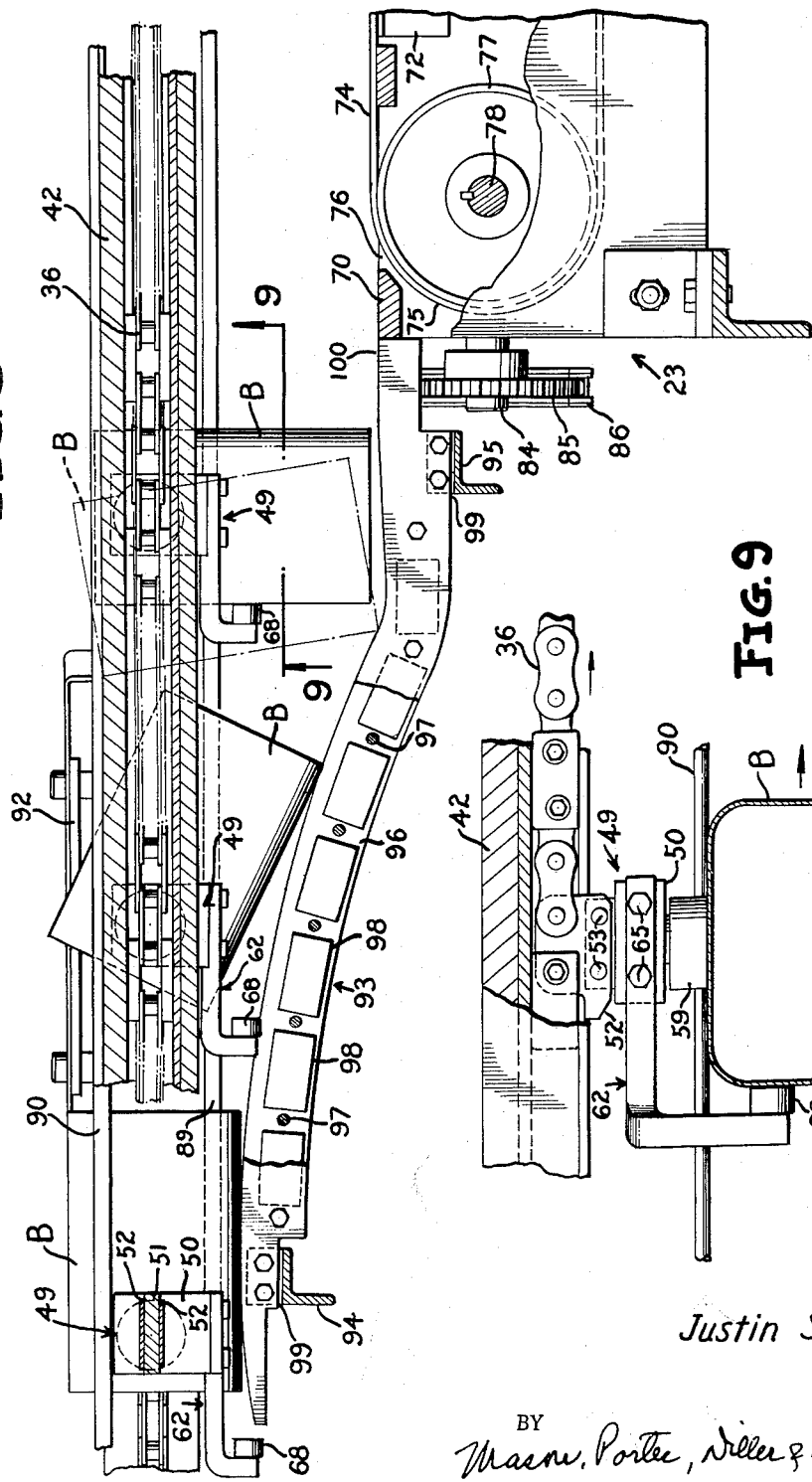

June 8, 1965   J. SIMPSON   3,187,876
CAN TURNING DEVICE
Filed March 19, 1963   6 Sheets-Sheet 5
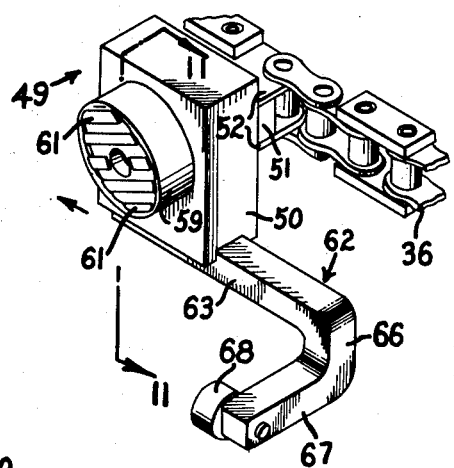
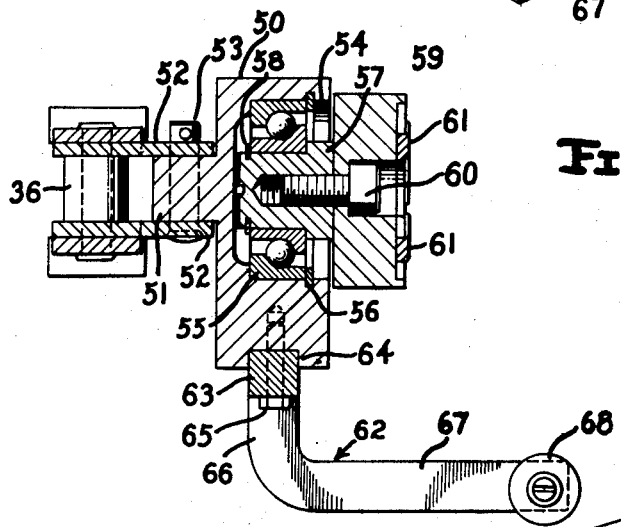
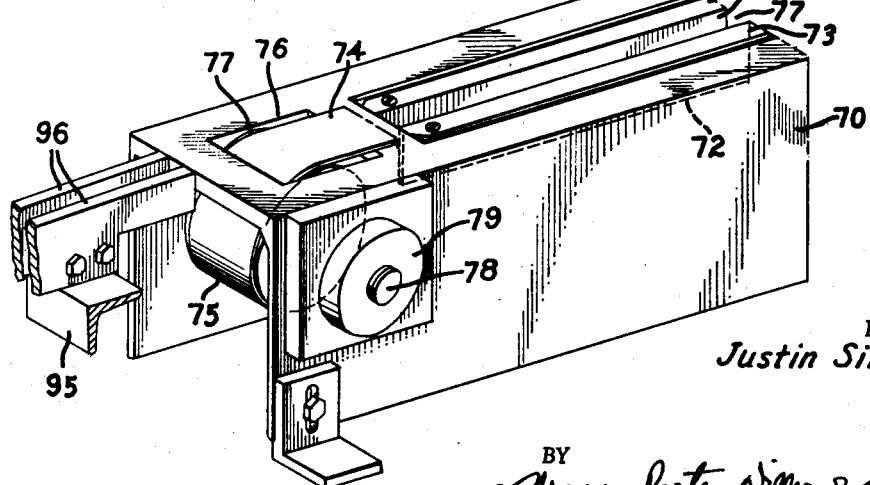
INVENTOR
Justin Simpson
BY
Mason, Porter, Diller & Stewart
ATTORNEYS

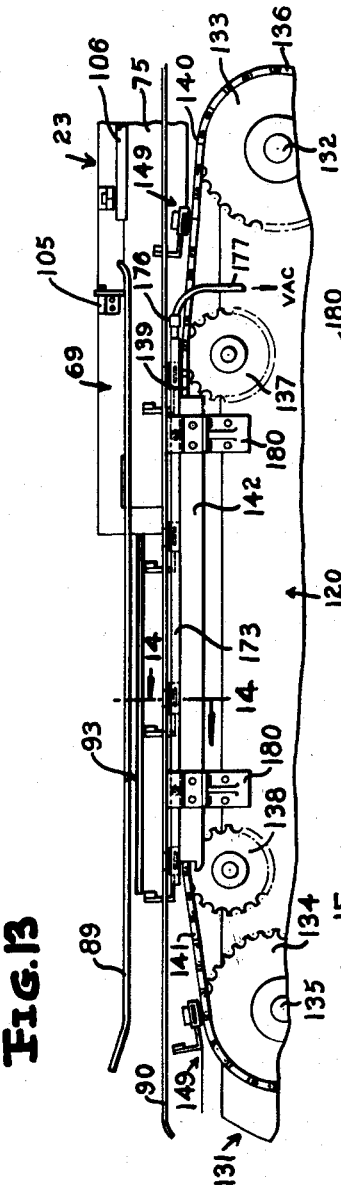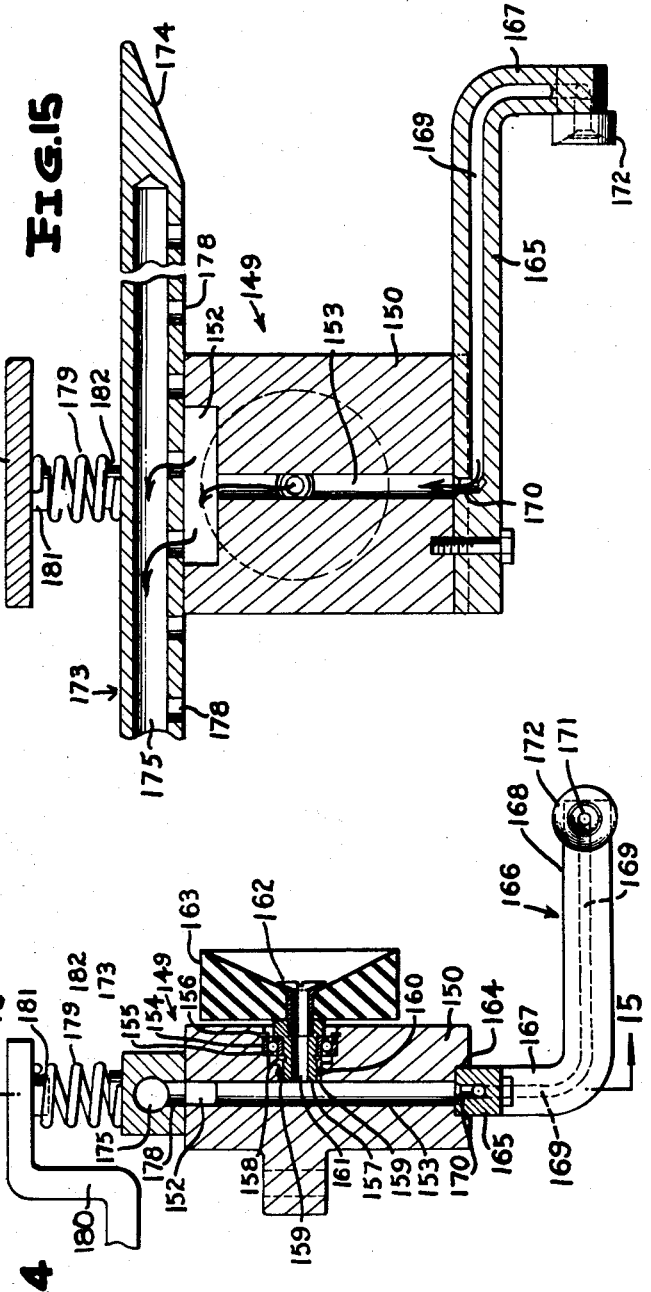

United States Patent Office 3,187,876
Patented June 8, 1965

3,187,876
CAN TURNING DEVICE
Justin Simpson, Elmhurst, Ill., assignor to Continental Can Company, Inc., New York, N.Y., a corporation of New York
Filed Mar. 19, 1963, Ser. No. 266,286
18 Claims. (Cl. 198—33)

This invention relates in general to new and useful improvements in transfer devices, and more particularly to a can turning device for effecting the turning of a can during an intermediate stage of transfer.

In the manufacture of cans, the can bodies are normally horizontally disposed and further operations on the can bodies normally take place while the can bodies are vertically disposed. It is, therefore, necessary to rotate the can bodies through an angle of 90 degrees between the body maker and the next operation mechanism, which may be an end seamer for applying an end to each can body.

In accordance with the foregoing, it is the primary object of this invention to provide a novel turning device which may be mounted adjacent the can body discharge conveyor associated with a body maker, for receiving can bodies therefrom, and rotating the can bodies from a horizontal relation to a vertical relation.

Another object of this invention is to provide a novel turning device which will engage a member to be turned in an offcentered position wherein the member may be rotated by a gravitational force to the desired upstanding position.

Still another object of this invention is to provide a novel turning device for receiving a member in a horizontal position and rotating the same to an upstanding position, the turning device including an endless conveyor having a plurality of rotatable heads mounted thereon, and each head having means for holding a member whereby when a head engages a horizontally disposed member in an offset position, and the member is released, the member will automatically rotate to an upstanding position.

One type of can body discharge conveyor for a body maker, now in use, is provided with a can body carrier in the form of an endless conveyor having a plurality of magnetic can body holders mounted thereon. These can body holders are normally disposed at a slight angle to the vertical so that a can body carried by the can body carrier is horizontally disposed and is tilted over sideways through a slight angle. In accordance with this inevntion, it is proposed to provide a can, or can body turning device which includes an endless conveyor having a run thereof disposed adjacent a run of the can carrier endless conveyor and having can gripping means thereon for gripping and holding can bodies received from the can carrier, and therebeing stripping means disposed intermediate the can carrier and the can turning device whereby the can bodies carried by the can carrier are tilted in a manner so as to remain horizontal and upright as opposed to being tilted so that the can bodies are stripped from the can carrier and are placed into positions for engagement by the can turning device.

A further object of this invention is to provide a novel turning device which includes a moving head which is mounted for rotation, a fixed stop associated with the moving head, and a ramp disposed adjacent the path of the head whereby a member gripped in an offcenter position with respect to the longitudinal center thereof when horizontally disposed, and moved by the head, will rotate under gravitational forces as controlled by the ramp and come to rest in an upstanding position as controlled by the fixed stop.

Still another object of this invention is to provide a novel turning device for rotating cans or can bodies from horizontal positions to upstanding positions, the turning device being of a construction wherein it may be provided with can body engaging means either of the magnetic type or of the pneumatic type.

A still further object of this invention is to provide a can turning device with a novel can body engaging head in the form of a suction cup and which head is movable along a predetermined path, the head having a suction passage opening therethrough in alignment with a suction manifold which is engaged by the head and serves to maintain a suction within the suction cup as the head moves along the manifold.

With the above and other objects in view that will hereinafter appear, the nature of the invention will be more clearly understood by reference to the following detailed description, the appended claims and the several views illustrated in the accompanying drawings.

In the drawings:
FIGURE 1 is a plan view showing the relationship of the can turning device of this invention with respect to the can body discharge conveyor associated with a body maker and a take-away conveyor for receiving rotated can bodies.

FIGURE 2 is a side elevational view of the can turning device of FIGURE 1 and shows further the details thereof.

FIGURE 3 is an enlarged fragmentary vertical sectional view taken along the line 3—3 of FIGURE 1 and shows a can body carried by the can carrier and being engaged by stripping rails for the purpose of transferring the same from the can carrier to the can turning device.

FIGURE 4 is an enlarged fragmentary transverse vertical sectional view taken along the line 4—4 of FIGURE 1 and shows a can body stripped from the can carrier and engaged by the turning device.

FIGURE 5 is an enlarged fragmentary transverse vertical sectional view taken along the line 5—5 of FIGURE 1 and shows a can body in the process of rotating from a horizontal position to a vertical position.

FIGURE 6 is an enlarged fragmentary vertical sectional view taken along the line 6—6 of FIGURE 1 and shows a can body in its fully rotated vertical position.

FIGURE 7 is an enlarged fragmentary transverse vertical sectional view taken along the line 7—7 of FIGURE 1 and shows a rotated can body transferred to a take-away conveyor and stripped from the turning device.

FIGURE 8 is an enlarged fragmentary vertical sectional view taken along the line 8—8 of FIGURE 1 and shows a series of can bodies in the process of being rotated from the horizontal to the vertical.

FIGURE 9 is an enlarged fragmentary horizontal sectional view taken along the line 9—9 of FIGURE 8 and shows the manner in which a rotating can body is maintained in an upright position and is moved longitudinally while in that position.

FIGURE 10 is an enlarged fragmentary perspective view showing one of the can body engaging units and a portion of the associated endless chain.

FIGURE 11 is an enlarged vertical sectional view taken along the line 11—11 of FIGURE 10 and shows the specific details of the can body engaging unit including the mounting of the head thereof for rotation.

FIGURE 12 is an enlarged fragmentary perspective view showing generally the details of the support for can bodies in the area where the can bodies are transferred from the can turning device to the take-away conveyor.

FIGURE 13 is a fragmentary horizontal sectional view similar to FIGURE 1 and shows a modified form of can turning device.

FIGURE 14 is an enlarged fragmentary transverse vertical sectional view taken along the line 14—14 of FIGURE 13 and shows the specific details of one of the can body engaging units which operates on a vacuum principal.

FIGURE 15 is an enlarged fragmentary longitudinal vertical sectional view taken generally along the line 15—15 of FIGURE 14 and shows the mounting of a vacuum manifold and the association thereof with one of the can body engaging units.

Referring now to the drawings in detail, reference is first made to the embodiment of the invention illustrated in FIGURES 1 through 12.

Referring specifically to the drawings, reference is made to FIGURE 1 wherein there is illustrated a can turning device, generally referred to by the numeral 20, which is associated with a body maker discharge conveyor generally referred to by the numeral 21, for receiving can bodies from a can carrier 22 thereof. The can turning device 20 is also associated with a take-away conveyor, generally referred to by the numeral 23. In accordance with this invention, can bodies are formed by the body maker (not shown) in horizontal positions and are delivered in such horizontal positions by the can carrier 22 to the can turning device 20 which rotates the can bodies to upright positions and transfers the same to the take-away conveyor 23. For the purpose of the present description the term "can" and "can body" are interchangeably used throughout as the invention is equally useful for turning either "cans" or "can bodies."

The can body discharge conveyor 21 associated with the body maker is of a conventional construction and only that portion of the can carrier 22 which is directly related to this invention will be set forth in detail. The can carrier 22 includes an endless conveyor chain 24 which is suitably mounted on and guided by a frame 25. The conveyor chain 24 is driven in timed relation with the operation of the body maker and carries sets of can body holding magnets. Each set of magnets includes a forward magnet 26 and a rear magnet 27, the magnet 27 having a lug 28 thereon to engage an end of a can body and thus position the can body relative to the set of magnets 26 and 27. Thus can bodies carried by the can carrier 22 are disposed in predetermined relation.

Reference is now made to FIGURE 3 wherein there is shown a typical mounting of one of the magnets, the magnet 27 being shown. It is to be noted that the magnet 27 is provided with a mounting bracket 29 which is connected to links of the chain 24 by means of an angle head 30 so that a generally rectangular cross sectional can body B carried by the magnets 26 and 27 slopes away from the chain 24 as is shown in FIGURE 3.

The can turning device 20 includes a suitable frame, generally referred to by the numeral 31, which is rigidly connected to the frame 25 of the body maker discharge conveyor 21. The frame 31 supports for rotation a vertical shaft 32 which is mounted at the right end of the frame 31, as is shown in FIGURE 1. The shaft 32 is driven from the body maker discharge conveyor 21 in a manner to be described hereinafter so that the can turning device 20 is synchronized with the body maker discharge conveyor 21. The shaft 32 carries a horizontally disposed drive sprocket 33 which is aligned with an idler sprocket 34 carried by a vertical shaft 35. An endless chain 36 is entrained around the sprockets 33 and 34. A pair of idler sprockets 37 and 38 are mounted intermediate the sprockets 33 and 34 and are spaced generally toward the can carrier 22 from the sprockets 33 and 34 to define a straight run 39, which extends between the sprockets 37 and 38, and tapered runs 40 and 41, which extend between the sprockets 37 and 33 on one hand and the sprockets 38 and 34 on the other. The straight run 39 passes through a guide 42 which will be described in detail hereinafter.

At this time it is pointed out that the frame 31 includes a guard plate 43 which extends around the outsides of the sprockets 33 and 34 and outwardly of the portion of the chain 36 remote from the straight run 39.

Referring now to FIGURE 2 in particular, it will be seen that the shaft 32 is connected to an angle drive unit 44 which is suitably supported by the frame 31. The drive unit 44 has a shaft 45 which extends longitudinally of the frame 31 in alignment with a drive shaft 46. A suitable clutch unit 47 releaseably couples together the shafts 45 and 46. The left end of the shaft 46, as viewed in FIGURE 2, is provided with a sprocket 47 over which there is entrained a drive chain 48 which is driven from the body maker discharge conveyor 21 in any conventional manner, thus assuring the synchronization of the chain 36 with the chain 24.

The chain 36 carries a plurality of identical can body engaging units, generally identified by the numeral 49. Each can body engaging unit 49 includes a block 50 having an ear 51 extending from one face thereof. The ear 51 is disposed between a pair of plate extensions 52 of the chain 36 and is releaseably connected to the plate extensions 52 by a pair of pins 53.

The face of the block 50 remote from the ear 51 is provided with a recess 54 in which there is seated a bearing 55. The bearing 55 is held in the recess 54 by means of a retainer 56. The bearing 55 is mounted on a shaft 57 and locked in place thereon by means of a retainer 58. The shaft 57 has releaseably secured thereto a head 59 by means of a fastener 60. The head 59 shown in FIGURES 10 and 11 is of the magnetic type, and has a plurality of permanent magnets 61 set in the exposed face thereof. It is to be noted that the head 59 and the shaft 57 rotate as a unit relative to the block 50 due to the mounting of the shaft 57 within the bearing 55.

The block 50 also carries an arm 62. The arm 62 includes an upper portion 63 which extends parallel to the chain 36 and is seated within a lower recess 64 in the underside of the block 50. The arm portion 63 is secured to the block 50 by suitable fastening means 65.

The arm portion 63 trails from the block 50 and terminates at its rear end in a downwardly directed portion 66 which is relatively short and which, in turn, terminates in a horizontally disposed transverse portion 67. The transversely disposed portion 67 is provided adjacent the extreme end thereof with a small magnet 68 which has limited holding power as compared to the holding power of the head 59 and the magnet inserts 61 thereof.

The take-away conveyor 23 includes a suitable frame, which is generally referred to by the numeral 69. The frame 69 is rigidly connected to the frame 31 of the can turning device 20 and extends generally parallel to the run 39 of the chain 36. The frame 69 includes a generally channel shaped belt support 70 which is provided with a central elongated opening 71 in which there is seated in back-to-back relation spaced angle members 72 having parallel horizontal legs 73 which serve as supports for an upper run 74 of an endless conveyor belt 75. The support 70 is also provided adjacent the opposite sides thereof with openings, such as the opening 76 shown in FIGURE 12. The opening 76 at the left end of the support 70 has projecting therethrough a portion of an idler roll 77 which is carried by a transverse shaft 78. The transverse shaft 78 is mounted within suitable bearings 79 secured to the outer faces of the support 70, as is shown in FIGURE 12.

The take-away conveyor 23 is provided at the right end of the support 70 with a drive roll 80 which is carried by a shaft 81 which is driven through an angle drive unit 82, best shown in FIGURE 1. The angle drive unit 82 is coupled, by means of a coupling 83, to a longitudinally extending shaft 84 which is provided at the left end thereof with a sprocket 85. A chain 86 is entrained over the sprocket 85 for driving the same. The chain 86 is also entrained over a sprocket (not shown) carried by the drive shaft 46.

The roll 80 projects through an opening in the top of the support 70 adjacent the right end therof, and the endless conveyor belt 75 is entrained over the rolls 77 and 80.

Reference is now made to FIGURES 3, 4 and 5, in particular, wherein it is shown that as the chain 24 approaches the general area of the can turning device 20, the chain passes through a suitable guide assembly 87 which is a part of the frame 25. The guide assembly 87 has secured thereto supports 88 which, in turn, support a guide member 89 which extends generally longitudinally of the apparatus and increases in its transverse distance from the guide 87 so as to tilt the can body B towards a vertical position, as is shown in FIGURE 4. While the can body B is being tilted through the engagement of the lower portion thereof with the guide 97, the upper portion thereof is being held in a fixed position by engagement with a second longitudinal guide 80 which is carried by a plurality of upstanding brackets 91 secured to the frame 31 of the can turning device 20.

It is to be noted that the guide 89, in tilting the can body B about a longitudinal axis from the position shown in FIGURE 3 to the position shown in FIGURE 4, also serves to partially strip the can body B from the magnets 26 and 27 carrying the same. In order to totally strip the can body B from the magnets, there is provided an upper guide 92, which generally opposes the guide 90. The upper guide 92, in cooperation with the guide 89, moves the can body B to the position shown in FIGURE 4 out of the sphere of influence of the magnets 26 and 27.

It is to be noted from FIGURES 1 and 4 that at the moment a can body is stripped from the magnets 26 and 27, the can body is brought to a vertical position and is in contact with an associated head 59 of one of the can body engaging units 49. Thus, as the can body B is stripped from the magnets 26 and 27, it is engaged by the magnets 61 and is not permitted to fall or lose momentum. At this time it is pointed out that since the chain 36 is driven in synchronism with the chain, the two chains being driven at the same speed, the orientation of the heads 59 with respect to can bodies B remains the same.

Reference is now made to FIGURE 8 wherein it is shown that each can body is engaged by a head 59 at a point to the left of the longitudinal center of the horizontally disposed can body and at the vertical center of such can body. Thus, if the can body is not supported, it will immediately tend to rotate about the axis of the associated shaft 57 to assume a vertical position due to the effect of gravitational forces thereon. In accordance with this invention, it is desired that the rotation of each can body B from a horizontal to a vertical position be a gradual one. To this end, there is provided a suitable ramp or guide rail unit, generally referred to by the numeral 93. The guide rail unit 93 is supported on a pair of transfer supports 94 and 95 and includes a pair of transversely spaced rails 96 which are spaced apart by means of spacers 98 and connected at spaced intervals by means of fasteners 97. The guide rail unit 93 is connected to the supports 94 and 95 by means of suitable brackets 99. It is to be noted that the upper surfaces of the guide rails 96 curve upwardly, then downwardly left to right, and then slightly upwardly again, as viewed in FIGURE 8, and terminate in lower horizontal portions 100 which are flush with the upper surface of the support 70. Thus the transfer of can bodies from the can turning device 20 to the take-away conveyor 23 in a smooth manner is assured.

Referring once again to FIGURE 8 in particular, it will be seen that the lower corner of each can body B rides down the guide rails 96 as the can body moves from left to right and the rate of turning of the can bodies is controlled by the curvature of the guide rails 96 and the rate of movement of the can body engaging units 49. As each can body B rotates to a vertical position, it is disposed above the horizontal portions 100 to the guide rails 96 and comes into engagement with the small magnets 68 of the associated can body engaging unit 49. The presentation of the small magnets 69 is two-fold. It functions first as a stop to limit the swinging of the can body B to a vertical position. At the same time, it attracts the can body and prevents bounce of the can body as it normally occurs upon the striking of a fixed stop.

Reference is now made to FIGURES 5 and 6 in particular, wherein it will be seen that the guide 42 for the straight run 39 of the chain 36 extends co-extensive with the guide rail unit 93 so that the chain 36 is fixed as to its path of movement and thus the path of movement of the can body engaging unit 49 is also fixed. In order to prevent twisting of the can body as it rotates from its horizontal position to its vertical position and the accidental disengagement of the can body from the head 59 of the associated can body engaging unit 49, the guide 90 continues and is supported by arms 101 carried by the guide 42. The guide 89 also continues in the area of the guide rail unit 93 and, in cooperation with the guide 90, prevents twisting of the can bodies B as they rotate from their horizontal positions to vertical positions.

Referring now to FIGURE 7, it will be seen that as the can bodies B pass along the take-away conveyor 23, they are stripped from the heads 59 and lowered onto the upper run 74 of the endless belt 75. This stripping while maintaining the can bodies in vertical positions is accomplished by means of a continuation of the guide 90 which is supported by suitable brackets 102 carried by the support 70. The guide 90 is disposed adjacent extreme upper ends of can bodies passing therealong and is assisted in its stripping operation by a guide 103 also carried by the brackets 102 in the manner best shown in FIGURE 7. It will be apparent that as the heads 59 move to the right along the diverging portions 40 of the conveyor chain run, the movement being to the right in FIGURE 7, like movement of the associated can body B is prevented by the guides 90 and 103 with the resultant stripping of the can body from the associated head 59. Tilting of the can body B to the left is prevented by a continuation of the guide 89 which is now supported by means of a suitable bracket 104 mounted on an upstanding support 105 carried by the support 70. The guide 89 terminates short of the mid-length of the take-away conveyor 23 and a rectangular cross sectional guide 106, carried by suitable brackets 107 (FIGURE 1), forms a continuation thereof to make certain the path of the can bodies carried by the conveyor belt 75.

Reference is now made to FIGURES 13, 14 and 15, wherein there is illustrated a modified form of a can turning device which is generally referred to by the numeral 120. For the most part, the can turning device 120 is identical with the can turning device 20 and includes a frame, generally referred to by the numeral 131. The frame 131 carries an upstanding drive shaft 132 on which there is mounted a horizontally disposed drive sprocket 133. The frame also carries an upstanding idler shaft 135 on which there is mounted an idler sprocket 134. An endless conveyor chain 136 is entrained about the sprockets 133 and 134. The conveyor chain 136 is guided intermediate the sprockets 133 and 134 by a pair of sprockets 137 and 138 so as to have a straight run portion 139 between the sprockets 137 and 138, a diverging run 140 between the sprockets 133 and 137 and a diverging run 141 between the sprocket 134 and 138. The straight run portion 139 is guided between the sprockets 137 and 138 by a guide 142.

The chain 136 carries a plurality of can body engaging units, generally referred to by the numeral 149. Each can body engaging unit 149, as is shown in FIGURES 14 and 15, includes a block 150 having an ear 151 projecting from the rear face thereof for securement to links of the chain 136. The block 150 is provided at the upper end thereof with an elongated port 152 which opens to the upper surface thereof. The port 152 has in communication therewith a passage 153 which extends the full height of the block 150 and opens out through the lower end thereof. The block 150 has a recess 154 in the face thereof remote from the ear 151. A bearing 155 is seated in the recess 154 and is locked therein by means of a retainer 156. The bearing 155 carries a tubular shaft 157 which is locked to the bearing 155 by means of a retainer 158. The tubular shaft projects into a bore 159 disposed behind the recess 154 and opening into the passage 153. Although the shaft 157 is rotatable with respect to the block 150, it is sealed relative thereto in any suitable manner, including by means of an O-ring 160 carried by the block 150.

The shaft 157 is provided with a bore 161 in which there is threaded a tubular fastener 162 which secures to the shaft 157 for rotation therewith a head 163. The head 163 is in the form of a suction cup and is preferably formed of a resilient material, such as a rubber-like material.

The lower face of the block 150 is provided with a longitudinal recess 164 in which there is seated a horizontal portion 165 of an arm, generally referred to by the numeral 166. The horizontal portion 165 terminates in a downwardly directed intermediate portion 167 which, in turn, terminates in a transversely extending horizontal portion 168. The arm 166, which may be bent from a single length of metal, has a bore 169 therethrough which extends through the portions 168 and 167 and terminates within the portion 165 in alignment with the passage 153 in a short passage 170. The extreme end of the bore 169 within the arm portion 168 is suitably plugged. A tubular fastener 171 is utilized to secure a small suction cup 172 to the arm portion 168 with the tubular fastener 171 opening into the bore 169 so that a vacuum may be formed within the suction cup 172.

The can turning device 120 also includes a longitudinally extending manifold 173 which is mounted alongside the guide 142, as is shown in FIGURE 13. The manifold 173 is in the form of an elongated bar having a pair of tapered ends 174 and being provided with a passage 175 extending substantially the full length thereof. The passage 175 has connected thereto a fitting 176 to which there is connected a vacuum line 177, as is shown in FIGURE 13.

The underside of the manifold 173 is provided with a plurality of small ports 178 through which a vacuum is continuously drawn. As is clearly shown in FIGURE 15, the ports 178 are so spaced whereby at all times at least one of the ports 178 opens into the port 152 as the can body engaging unit 149 passes below the manifold 173.

The length of the manifold 173 and the spacing of the can body engaging unit 149 are such whereby the manifold 173 will always be engaged by at least two, and preferably more, blocks 150. The blocks 150 serve as supports for the manifold 173 with the manifold 173 floatingly riding on the blocks 150 as the blocks 150 pass therebeneath. The manifold 173 is constantly held against the upper surfaces of the blocks 150 by means of springs 179 which spaced longitudinally of the manifold 173 and which are carried by brackets 180 which are suitably secured to the frame 131 of the can turning device 120. The brackets 180 are provided with pins 181 which receive the upper ends of springs 179. The manifold 173 is provided with similar pins 182 which are received in the lower ends of the springs 179. Thus the springs 179 not only serve to hold the manifold 173 down against the block 150, but also to prevent longitudinal movement of the manifold 173.

The operation of the can turning device 120 is identical with that of the can turning device 20. However, in lieu of a can body being engaged by the magnetic head 59 of the can body engaging unit 49, the can body is engaged by the suction cup head 154 of the can body engaging unit 149. The small suction cup 172 functions in identically the same manner as the small magnet 68.

It will be readily apparent that the can turning devices 20 and 120, although they are very simple in structure, serve to effect the necessary turning of can bodies in a controlled manner whereby there are no sudden forces involved and the possibility of distortion and denting of the can bodies is entirely eliminated. On the other hand, the can turning devices are of a construction whereby they may be readily mounted intermediate a body maker discharge conveyor and a take-away conveyor and driven from the body maker discharge conveyor in synchronized relation therewith.

Although only two preferred embodiments of the invention have been specifically illustrated and described herein, it is to be understood that minor changes may be made in the disclosed can turning device within the spirit and scope of the invention, as defined by the appended claims.

I claim:

1. A container turning device for turning containers moving in a plane, said container turning device comprising a movable carrier, a container holder carried by said carrier for movement therewith, said container holder including a container attracting member for effecting a temporary connection with a wall of a container, means mounting said container attracting member for rotation about an axis disposed normal to the plane of container movement whereby containers remain in a common plane during the turning thereof, and means for controlling the turning of a container held by said container attracting member.

2. A container turning device for turning containers moving in a plane, said container turning device comprising a movable carrier, a container holder carried by said carrier for movement therewith, said container holder including a container attracting member for effecting a temporary connection with a wall of a container, means mounting said container attracting member for rotation about an axis disposed normal to the plane of container movement whereby containers remain in a common plane during the turning thereof, and means for controlling the turning of a container held by said container attracting member, said container attracting member being in the form of a suction head, a suction manifold overlying a portion of the path of movement of said container holder with said container holder having sliding and sealing engagement therewith, and said suction manifold being resiliently urged towards and supported by said container holder.

3. A container turning device for turning containers from a horizontal position to an upstanding position comprising container delivery means, a movable carrier disposed adjacent said container delivery means, a container holder carrier by said carrier for movement therewith, said container holder including pivotally mounted container gripping means for pivoting about a horizontal axis disposed generally normal to the direction of movement of said container holder, and means driving said carrier in timed relation to the positioning of containers by said delivery means to effect the engagement of a container by said gripping means in an offcenter position whereby a container gripped by said gripping means is gravity urged to an upstanding position.

4. The container turning device of claim 3 together with a guide ramp disposed along the path of movement of a container carried by said container holder for restricting the pivoting of a container.

5. The container turning device of claim 3 wherein said container holder also includes a container stop for limiting pivoting of a container to a vertical position.

6. The container turning device of claim 3 wherein said container holder also includes a container stop for limiting pivoting of a container to a vertical position, and said container gripping means and said container stop each includes a container attracting member.

7. In combination with a discharge conveyor of a can body maker wherein can bodies are delivered in a horizontal position along a horizontal path, a can turning device for turning cans delivered from the discharge conveyor to upright positions for effecting the seaming of ends thereon, said can turning device comprising a movable carrier disposed adjacent said discharge conveyor, a can holder carried by said carrier for receiving cans from said discharge conveyor, said can holder including a pivotally mounted can gripping means for gripping cans in off-center relation whereby cans gripped by said can gripping means are gravity urged to upstanding positions.

8. The can turning device of claim 7 together with a guide ramp disposed along the path of movement of a can carried by said can holder for restricting the pivoting of a can.

9. The can turning device of claim 7 wherein said can holder also includes a can stop for limiting pivoting of a can to a vertical position.

10. The can turning device of claim 7 wherein said can holder also includes a can stop for limiting pivoting of a can to a vertical position, and said container gripping means and said can stop each includes a can attracting member.

11. The can turning device of claim 7 wherein said movable carrier is in the form of an endless conveyor having at least one horizontal run, and there are a plurality of said can holders carried by said movable carrier.

12. In combination with a discharge conveyor of a can body maker wherein can bodies are delivered in a horizontal position along a horizontal path, a can turning device for turning cans delivered from the discharge conveyor to upright positions for effecting the seaming of ends thereon, said can turning device comprising a movable carrier disposed adjacent said discharge conveyor, a can holder carried by said carrier for receiving cans from said discharge conveyor, said can holder including pivotally mounted can gripping means for gripping cans in off-center relation whereby cans gripped by said can gripping means are gravity urged to upstanding positions, and a take-away conveyor positioned beneath the path of movement of upstanding cans for receiving cans from said can holder.

13. A container turning device for turning containers moving in a plane, said container turning device comprising a movable carrier, a container holder carried by said carrier for movement therewith, said container holder including a container attracting member for effecting a temporary connection with a wall of a container, means mounting said container attracting member for rotation about an axis disposed normal to the plane of container movement whereby containers remain in a common plane during the turning thereof, and a fixed container engaging ramp for controlling the turning of a container held by said container attracting member.

14. A container turning device for turning containers moving in a plane, said container turning device comprising a movable carrier, a container holder carried by said carrier for movement therewith, said container holder including a container attracting member for effecting a temporary connection with a wall of a container, and an arm for engaging a container and positioning the same relative to said container attracting member, means mounting said container attracting member for rotation about an axis disposed normal to the plane of container movement whereby containers remain in a common plane during the turning thereof, and means for controlling the turning of a container held by said container attracting member.

15. A container turning device for turning containers moving in a plane, said container turning device comprising a movable carrier, a container holder carried by said carrier for movement therewith, said container holder including a container attracting member for effecting a temporary connection with a wall of a container, and an arm for engaging a container and positioning the same relative to said container attracting member, said arm bearing a second container attracting member for engagement with containers at an angle to the first mentioned container attracting member, means mounting said container attracting member for rotation about an axis disposed normal to the plane of container movement whereby containers remain in a common plane during the turning thereof, and means for controlling the turning of a container held by said container attracting member.

16. The can turning device of claim 15 wherein said second container attracting member is of a lesser power than the first container attracting member.

17. A container turning device for turning containers moving in a plane, said container turning device comprising a movable carrier having a path of movement which includes a straight line portion, a container holder carried by said carrier for movement therewith to move containers along said straight line portion, said container holder including a suction head for effecting a temporary connection with a wall of a container, means mounting said contianer attracting member for rotation about an axis disposed normal to the plane of container movement along said straight line portion whereby containers remain in a common plane during the turning thereof, and means for controlling the turning of a container held by said suction head.

18. The container turning device of claim 17 wherein a suction manifold overlies that portion of the path of movement of said container holder along the straight line portion of the path of movement of the carrier with said container holder having sliding and sealing engagement therewith.

References Cited by the Examiner

UNITED STATES PATENTS 2,016,814  10/35  Ferguson.
2,359,432  10/44  McNamara.
2,643,778  6/53  Socke _____ 198—41

SAMUEL F. COLEMAN, *Primary Examiner.*

ERNEST A. FALLER, JR., *Examiner.*